United States Patent
Mueller

[11] 3,802,027
[45] Apr. 9, 1974

[54] PLASTIC CLOSURE BUSHING
[75] Inventor: Hugo Mueller, Livingston, N.J.
[73] Assignee: American Flange & Manufacturing Co. Inc., New York, N.Y.
[22] Filed: Apr. 23, 1973
[21] Appl. No.: 353,742

[52] U.S. Cl........................... 16/2, 137/318, 217/111
[51] Int. Cl.... B65d 17/00, B65d 39/04, B65d 39/12
[58] Field of Search....... 85/32.1; 217/98, 110, 111, 217/113; 137/317, 318; 16/2, 3

[56] References Cited
UNITED STATES PATENTS
1,966,384  7/1934  Gabel et al. .......................... 217/111
3,438,531  4/1969  Millard et al. ...................... 217/110
3,592,351  7/1971  Johnson et al. ..................... 137/318

FOREIGN PATENTS OR APPLICATIONS
94,449  10/1962  Denmark ........................... 217/111

*Primary Examiner*—Donald A. Griffin

[57] ABSTRACT

A closure bushing molded of synthetic plastic material having an internally threaded cylindrical wall terminating at one end in a laterally extending octagonally shaped flange. The other end of the cylindrical wall is closed off by a tamperproof sealing diaphragm bordered by a circumferential weakened tearing zone and having a center panel recessed within the bushing interior.

4 Claims, 6 Drawing Figures

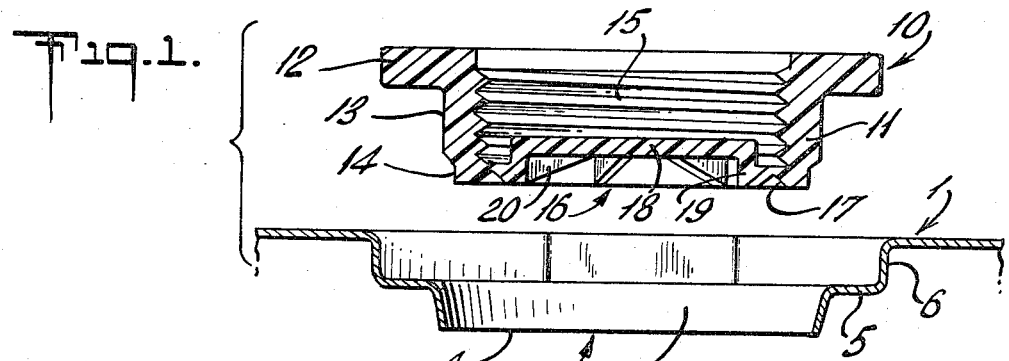
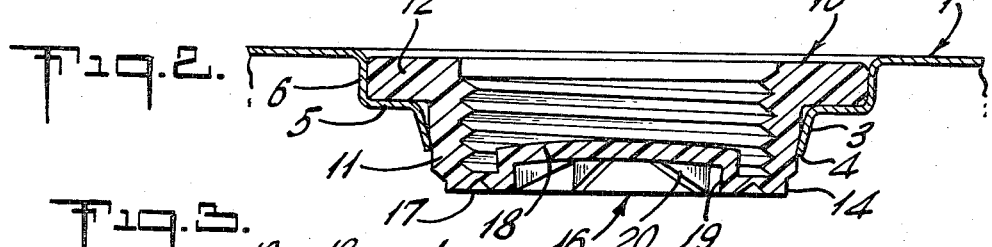
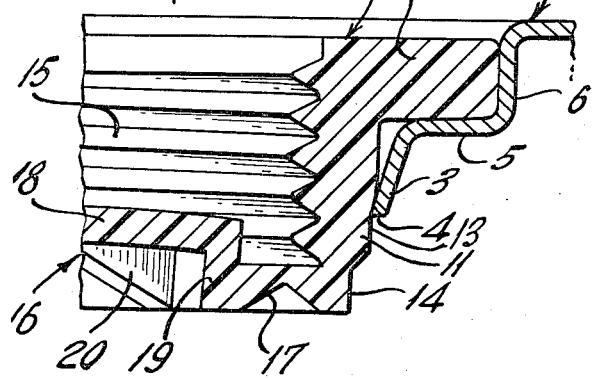
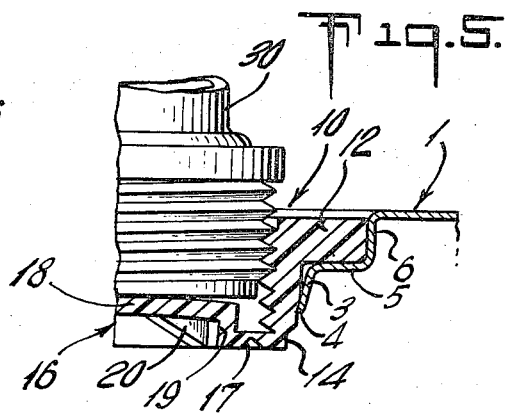
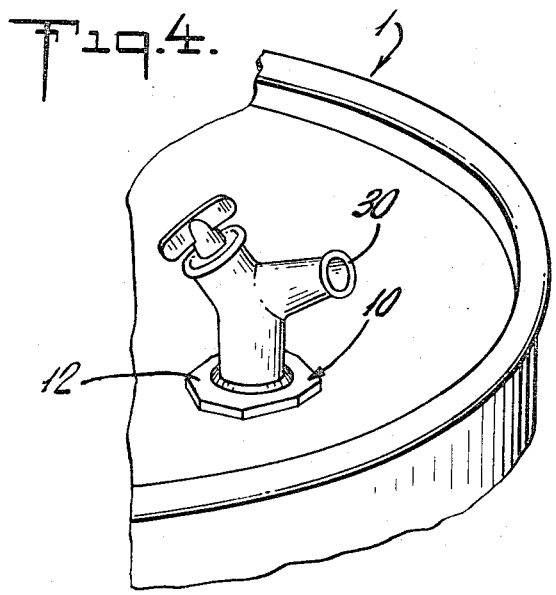
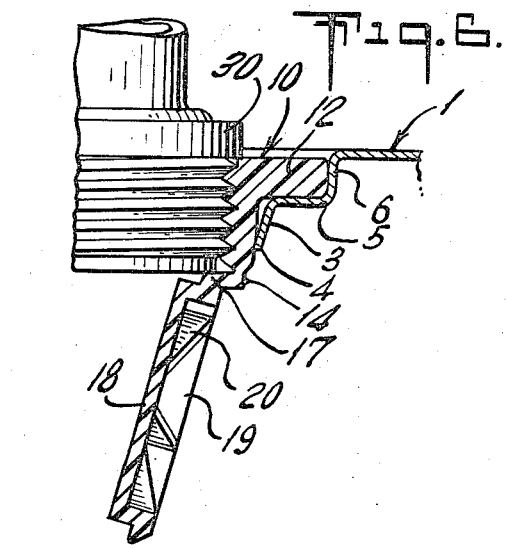

PLASTIC CLOSURE BUSHING

BACKGROUND OF THE INVENTION

It has been proposed to make a closure bushing out of molded synthetic plastic material duplicating to a large degree one type of pressed in steel bushing, commonly employed in the fabrication of steel drum and pail closures, for reception of a screw threaded plug. Among the advantages offered by such an all plastic closure bushing is its economy of manufacture, its inherent resistance to a wide variety of chemicals and its natural gasketing properties which yield high sealing efficiencies. In addition, the physical properties of synthetic plastic materials make the provision of an easily rupturable sealing diaphragm in such a closure bushing a relatively simple matter. The benefits of providing an imperforate tamperproof sealing barrier to protect the container contents in addition to the primary plug seal are obvious.

What has not heretofore been obvious and in fact is exactly the problem to which this invention is directed, is development of a specific closure bushing construction with sealing diaphragm incorporated therein which will advantageously lend itself to a press fit container wall engagement. Pressing the bushing into the container wall opening requires an appreciable reduction in the bushing wall circumference in order to effect the necessary sealing contact with the surrounding container wall opening. Previous attempts to develop such a closure bushing construction have not been completely successful due to the resulting concentration of deleterious stresses in the weakened tearing zone during insertion which have frequently caused failure.

The invention offers an effective solution to the above described problem and improves over known prior art closure bushing constructions in providing an all plastic closure bushing with an imperforate sealing diaphragm and adapted for press fit engagement within a container wall opening. The sealing diaphragm in the invention is arranged within the bushing so as to redirect those forces normally created during insertion and distribute them throughout the sealing diaphragm, thus relieving the critical area of the tearing zone from the likelihood of damage. The resulting low cost invention bushing meets essential strength requirements while achieving a high degree of sealing efficiency.

It is accordingly a principal object of the invention to provide a new plastic closure bushing adapted for press fit engagement within a container wall opening.

Another object is to provide a plastic closure bushing having an integrally formed sealing diaphragm disposed within the bushing wall so as to minimize fracturing due to insertion within a container wall opening.

Other and more detailed objects will in part be obvious and in part pointed out as the description of the invention taken in conjunction with the accompanying drawing proceeds.

In that drawing:

FIG. 1 is an exploded cross-sectional view of the closure bushing and container wall of the invention;

FIG. 2 is a view similar to FIG. 1 showing the bushing inserted within the container wall opening;

FIG. 3 is an enlarged fragmentary sectional view of the closure bushing sealing diaphragm of FIG. 2;

FIG. 4 is a perspective view of the invention fitted with a fluid dispensing tap;

FIG. 5 is a fragmentary sectional view of the closure bushing showing the threaded engagement of a dispensing tap just prior to rupturing of the sealing diaphragm; and FIG. 6 is a view similar to FIG. 5 but showing the tap fully engaged in dispensing position.

FIG. 1 shows a container wall 1 having a circular opening 2 surrounded by a downwardly and radially inwardly extending conical neck 3 terminating at its lowermost extent in a free edge 4. The conical neck 3 extends downwardly from a depressed embossment having a horizontal annular wall 5 joined to the neck 3 and surrounded by a substantially vertical octagonal sidewall 6 extending downwardly from the container wall 1.

Also shown in FIG. 1 is the closure bushing 10 of the invention molded of synthetic plastic material such as polyethylene and comprising a cylindrical wall 11 terminating at its upper end in circumferential hexagonally shaped flange 12. The cylindrical wall 11 beneath the flange 12 has a straight uninterrupted exterior surface 13 except for a lower end pilot portion 14 of reduced outside diameter. A screw thread 15 is formed along the interior surface of the cylindrical wall 11.

An integrally molded tamperproof sealing diaphragm 16 is joined by a weakened tearing zone 17 to the lowermost end of the cylindrical wall 11. The sealing diaphragm 16 closes off the interior of the wall 11 and includes a center panel 18 recessed within the bushing interior and connected to the tearing zone 17 by an annular short vertical wall 19. A series of buttress portions 20 connect the annular wall 19 with the undersurface of the center panel 18.

In FIG. 2 the bushing 10 is shown inserted within the container wall opening 2 and securely held in place by a leakproof press fit engagement. Accidental retraction of the bushing from the container wall opening is guarded against by a tight squeezing in of the cylindrical wall 11 above the pilot portion 14 causing the free edge 4 of the container wall opening to bite into the cylindrical wall exterior surface 13. In so doing, relatively severe stresses are set up in the sealing diaphragm and tearing zone at the lower end of the bushing as indicated by the slightly concave configuration of the undersurface of the diaphragm. These stresses are the result of forces radially applied to the tearing zone 17 which unless relieved or somehow directed away from the weakened tearing zone will introduce a serious likelihood of failure due to rupturing or stress cracking along the tearing zone.

In the invention closure bushing construction disclosed, the above described deficiency inherent in a press fit closure bushing having the sealing diaphragm and the tearing zone lying in the same plane, is effectively overcome. As seen in FIG. 3, the forces radially applied to the tearing zone 17 are in large part redirected away from the plane of the tearing zone and absorbed in the bulged center panel 18 and the radially outwardly flexed vertical diaphragm wall 19. As a result the forces, normally concentrated at the zone in the diaphragm intentionally weakened for authorized removal, are appreciably minimized and rendered harmless to the bushing construction.

In FIGS. 4 through 6 a tap 30 is shown threadedly engaged within the bushing to facilitate dispensing of the container contents. As the tap 30 is screwed into the bushing, the lowermost end of the tap contacts the upper surface of the diaphragm center panel 18. It should be noted here that the recessed panel 18 also serves to reduce the amount of thread engagement required until a downwardly directed force is applied to the sealing diaphragm. Continued turning of the spout causes the sealing diaphragm 16, rigidified by the buttress portions 20, to rupture along the tearing zone 17. Here again, the raised diaphragm center panel aids in concentrating the downwardly directed forces, applied by the spout end, at the tearing zone 17 for maximum ease of tearing. Finally, complete seating of the spout 30 effects a leakproof engagement along the bushing threads 15 and forces the ruptured sealing diaphragm to extend into the container. The remaining short section of the tearing zone which remains intact acts as an effective hinge to prevent the ruptured sealing diaphragm from falling into the container.

Having described my invention, what I claim is as follows:

1. A closure bushing molded of synthetic plastic material and adapted for press fit engagement within a container wall opening comprising a cylindrical wall, an internal screw thread formed along said wall, container wall engaging means on said wall, an integrally molded sealing diaphragm closing off said cylindrical wall adjacent one end, said sealing diaphragm including a weakened tearing zone joining the interior of said cylindrical wall and means formed in said diaphragm for protecting said tearing zone against accidental rupturing during insertion of said bushing within a container wall opening whereby forces radially applied to said tearing zone are redirected away from the plane of said tearing zone.

2. A closure bushing as in claim 1 wherein said means for protecting said tearing zone includes a sealing diaphragm center panel axially displaced with respect to said tearing zone.

3. A closure bushing as in claim 2 wherein said center panel is recessed within the interior of said bushing cylindrical wall.

4. A closure housing as in claim 1 and including torque resisting means formed on said cylindrical wall for resisting relative rotational movement between said bushing and container wall opening.

* * * * *